United States Patent

Kashimura et al.

[11] Patent Number: 5,945,609
[45] Date of Patent: Aug. 31, 1999

[54] MASS FLOWMETER FOR MEASURING FLOW RATE OF A FLUID

[75] Inventors: Osamu Kashimura; Hironobu Yao, both of Tokyo, Japan

[73] Assignee: Fuji Electric Co., Ltd., Kawasaki, Japan

[21] Appl. No.: 08/922,140

[22] Filed: Aug. 29, 1997

Related U.S. Application Data

[63] Continuation-in-part of application No. 08/613,007, Mar. 8, 1996, Pat. No. 5,796,010.

[30] Foreign Application Priority Data

Apr. 9, 1996 [JP] Japan .................................. 8-233810

[51] Int. Cl.$^6$ .................................................... G01F 1/78
[52] U.S. Cl. ............................................... 73/861.357
[58] Field of Search ...................................... 73/861.357

[56] References Cited

U.S. PATENT DOCUMENTS

| | | | |
|---|---|---|---|
| 5,323,658 | 6/1994 | Yao et al. | 73/861.357 |
| 5,365,794 | 11/1994 | Hussain et al. | 73/861.357 |
| 5,381,697 | 1/1995 | Van Der Pol | 73/861.357 |
| 5,398,554 | 3/1995 | Ogawa et al. | 73/861.357 |
| 5,531,126 | 7/1996 | Drahm | 73/861.357 |
| 5,796,010 | 8/1998 | Kishiro | 73/861.357 |

*Primary Examiner*—George Dombroske
*Assistant Examiner*—Jewel Thompson
*Attorney, Agent, or Firm*—Kanesaka & Takeuchi

[57] ABSTRACT

A mass flowmeter for measuring the flow rate of a fluid by generating a Coriolis force in a measuring pipe includes a housing and a mechanism for supporting the pipe in the housing. The support mechanism includes a generally cylindrical hollow beam and first and second end support members. The measuring pipe is supported inside the hollow beam by the end support members. A vibrator for vibrating the measuring pipe and two sensors for detecting these vibrations are provided in the housing. The effective vibrating length of the measuring pipe is set shorter than the effective vibrating length of the support mechanism so as to set the vibration frequency of the measuring pipe higher than the natural frequency of the support mechanism, without reducing the rigidity of the support mechanism or using any additional mass.

10 Claims, 3 Drawing Sheets

MASS FLOWMETER FOR MEASURING FLOW RATE OF A FLUID

CROSS REFERENCE TO RELATED APPLICATION

The present application is a continuation-in-part application of U.S. patent application Ser. No. 08/613,007, filed Mar. 8, 1996, now U.S. Pat. No. 5,796,010.

BACKGROUND OF THE INVENTION AND RELATED ART STATEMENT

The present invention relates to a mass flowmeter that measures mass flow rate based on a Coriolis force generated in proportion to the mass flow rate of a fluid flowing through at least one vibrating measuring pipe. More specifically, the present invention relates to a mass flowmeter that is lightweight, simple in structure and easy to use, and which significantly improves the reliability and precision in mass flow rate measurement.

The Coriolis mass flowmeter facilitates high precision measurement of a mass flow rate, since it directly measures the mass flow rate based on the Coriolis force generated in proportion to the mass flow rate of a fluid flowing through one or more of vibrating measuring pipes. Generally, this kind of mass flowmeter may be classified into two categories. One is a mass flowmeter which includes a curved measuring pipe, such as a U or S-shaped pipe, and another is a mass flowmeter which includes a straight measuring pipe. The mass flowmeter may include two measuring pipes, which are arranged in parallel such that the fluid in question is distributed proportionally or connected in tandem and resonated (cf. Japanese Examined Patent Application No. H06-46167).

The mass flowmeter which includes one measuring pipe is described in the foregoing related application, and FIG. 3 illustrates in cross-section a single-measuring-pipe-type of the mass flowmeter. This type of mass flowmeter includes a support mechanism comprised of support members 3a, 3b, and a cylindrical tubular beam 4 for supporting a measuring pipe 2 at both ends thereof; a vibrator 5 for vibrating the measuring pipe 2; two vibration sensors 6a, 6b, for detecting vibrations in the measuring pipe 2; an inlet pipe 7a for guiding a fluid in question to the measuring pipe 2; an outlet pipe 7b for guiding the fluid in question out from the measuring pipe 2; and a housing 8 for supporting these components. This mass flowmeter facilitates sensing highly stable vibrations with high S/N ratio, by setting the frequency of the Coriolis vibrations generated in the measuring pipe to be higher than the natural frequency of the support mechanism. The Coriolis vibration frequency is set, for example, to be at or about √2 times or more and, preferably, twice the natural frequency of the support mechanism.

The disclosure of the parent application Ser. No. 08/613,033 is incorporated in the present application.

The effects of producing Coriolis vibrations at a frequency higher than the natural frequency of the support mechanism, are further enhanced by utilizing the phase difference between the upstream and downstream vibration sensors, and by employing speed or acceleration sensors as the vibration sensors.

The Coriolis vibration frequency of the measuring pipe may be set at a level higher than the natural frequency of the support mechanism, by lowering the resonance frequency of the support mechanism, or by utilizing the higher order modes of the natural vibration, e.g., the third order mode or the fifth order mode, of the measuring pipe, as the Coriolis vibrations produced in the measuring pipe.

However, when a higher order mode of vibration is used for measuring pipes with various diameters designed for many purposes, the natural frequency of the higher order mode of vibration for the measuring pipe, not interfered by unwanted vibration modes, could not always be set at a level high enough than the natural vibration frequency of the support mechanism.

For example, when the rigidity of the support mechanism is lowered by reducing its thickness, the characteristic values, such as natural vibration frequencies in the circumferential direction of the support mechanism, tend to be lower, and the fundamental natural vibrations with the lowered frequency in the circumferential direction of the support mechanism and the higher order mode, e.g., third order mode, of the natural bending vibrations of the measuring pipe, tend to interfere with each other. Additional mass provided to the support mechanism leads to a complex structure, which further adds to the cost of the mass flowmeter, and unrealistically heavy mass must be handled.

In view of the foregoing, it is an object of the invention to provide a mass flowmeter which has a low manufacturing cost in view of its simple design, is lightweight and easy to use, and which significantly improves the reliability and precision in mass flow rate measurement.

It is another object of the invention to provide a mass flowmeter which facilitates to set Coriolis vibration frequencies at a level higher than the natural vibration frequency of the support mechanism.

SUMMARY OF THE INVENTION

According to a first aspect of the present invention, there is provided a mass flow meter which includes: at least one measuring pipe which is being vibrated at a frequency such that a Coriolis force is generated when a fluid flows through the vibrating measuring pipe to measure the mass flow rate of the fluid; a support mechanism comprising a cylindrical tubular beam and end support members, wherein the support mechanism links both ends of the measuring pipe; a vibrator for vibrating the measuring pipe; two or more vibration sensors which detect the vibrations in the measuring pipe; at least one inlet pipe through which the fluid flows into the measuring pipe; at least one outlet pipe through which the fluid flows out from the measuring pipe; a housing that supports therein all the foregoing components. The length of the measuring pipe pertinent to the Coriolis vibrations is set so as to be shorter than the length of the support mechanism pertinent to the fundamental natural vibrations of the support mechanism, thereby setting the Coriolis vibration frequency higher than the fundamental natural vibration frequency of the support mechanism.

In the first aspect of the invention, the thickness of the end support member in the axial direction is made such that the thickness of an engaging portion with the measuring pipe is thicker than the thickness of an engaging portion with the tubular beam at the vibration side of the tubular beam (second aspect). The end support members may be generally T-shaped with a bore extending through the length thereof for receiving the measuring pipe in the axial direction.

In a second aspect, the end support member may further include an annular cutout portion formed on the engaging portion with the measuring pipe away from a portion for receiving the vibration from the measuring pipe (third aspect).

Preferably, the Coriolis vibration frequency is set to be at or about √2 times or more than the fundamental natural vibration frequency of the support mechanism (fourth aspect).

More preferably, the Coriolis vibration frequency is set at a higher order mode than the natural vibration frequency of the at least one measuring pipe (fifth aspect).

Advantageously, the mass flow rate of the fluid is measured based on the phase difference(s) between the output signals from two or more vibration sensors (sixth aspect).

A speed sensor or acceleration sensor may be used as the vibration sensors (seventh aspect).

DETAILED DESCRIPTION OF PREFERRED EMBODIMENTS

Figure 1:
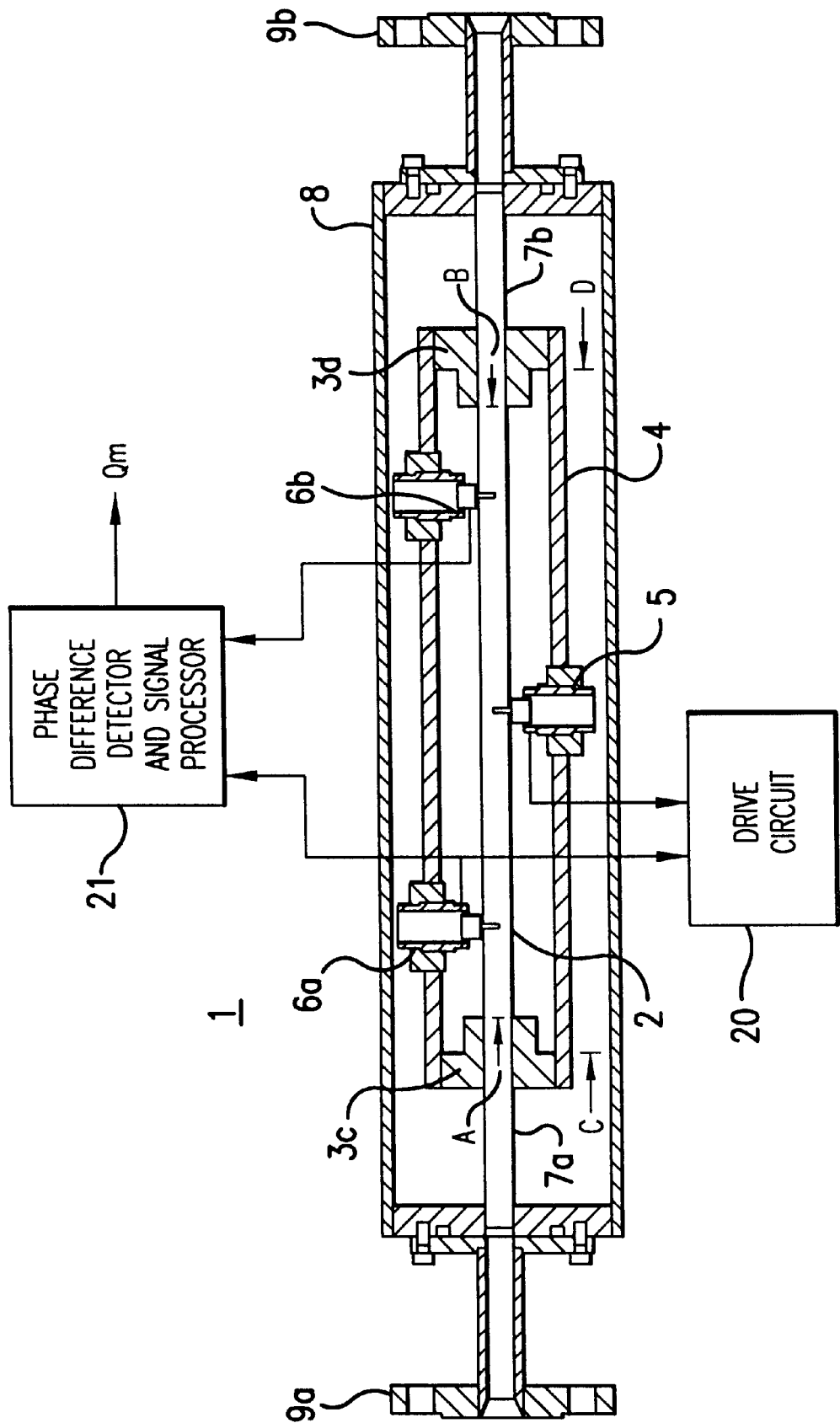
FIG. 1 is a cross-sectional view of a first embodiment of a mass flowmeter according to the invention.

FIG. 1 illustrates in a cross-sectional view, a first embodiment of the mass flowmeter according to the invention. Referring now to FIG. 1, a straight measuring pipe 2 is shown to be fixed at both ends thereof by brazing or welding to generally T-shaped end support members 3c and 3d. The support members 3c and 3d are connected to a cylindrical tubular beam 4 to counteract any vibrations in members 3c, 3d, in the direction of the straight measuring pipe 2. The support members 3c, 3d and the cylindrical tubular beam 4, constitute a support mechanism that links together both ends of the measuring pipe 2.

A vibrator 5, including a magnet mounted in the central part of the measuring pipe 2 and a coil fixed to the cylindrical tubular beam 4, vibrates the measuring pipe 2. Two magnetic vibration sensors, e.g., speed sensors 6a and 6b, each including a magnet mounted on the straight measuring pipe 2 and a coil fixed to the cylindrical tubular beam 4, detect the vibrations in the measuring pipe 2. The magnets of the magnetic sensors 6a, 6b, are mounted symmetrically on both sides of the vibrator 5. While only two sensors are shown in FIG. 1, it is within the scope of this invention to utilize more, or as many as needed.

An inlet pipe 7a and an outlet pipe 7b are fabricated integrally with the measuring pipe 2. The inlet pipe 7a and outlet pipe 7b are connected with the respective ends of a housing 8. The fluid in question flows into the measuring pipe 2, through the inlet pipe 7a, and exists from the measuring pipe 2 through the outlet pipe 7b. The housing 8 supports all of the above-described components therein. The housing 8 is connected to flanges 9a and 9b, by screwing or welding. In the figure, the reference numeral 20 designates a driver circuit and reference numeral 21 designates a phase-difference-detection-type signal processing circuit.

Coriolis vibrations are generated at the third order mode frequency of the natural vibration frequency of the measuring pipe 2, by vibrator 5 and driver circuit 20.

Figure 3:
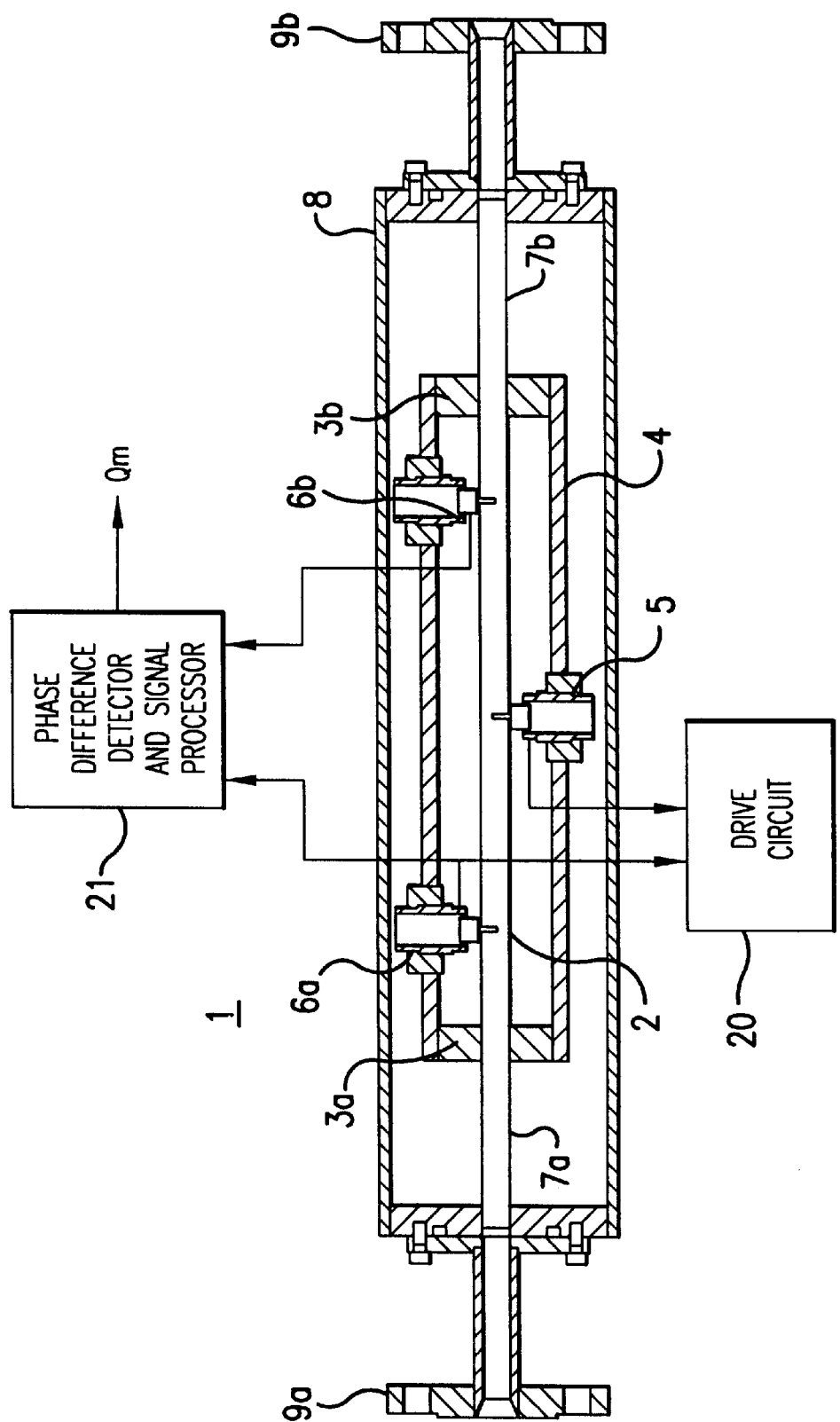
FIG. 3 is a cross-sectional view of a related single-measuring-pipe-type mass flowmeter.

The foregoing explanation also applies to the related mass flowmeter of FIG. 3.

The Coriolis vibration frequency of the measuring pipe 2 is determined by its external shape, thickness and length between the support members 3c and 3d (the length between arrows A and B in FIG. 1; hereinafter referred to as the "vibration length or vibrating length of the measuring pipe"). Referring again to FIG. 3 showing the related mass flowmeter, the vibrating length of the measuring pipe 2 is set to be equal to the length of the cylindrical tubular beam 4 (the length between arrows C and D in FIG. 1; hereinafter referred to as the "vibration length or vibrating length of the support mechanism").

Referring now to FIG. 1 showing the mass flowmeter according to the invention, the support members 3c and 3d are generally T-shaped in cross-section and are thicker in their portions engaging the measuring pipe 2, than the portions thereof engaging the cylindrical tubular beam 4. The thicker portions of the support members 3c, 3d, face each other such that the vibrating length of the cylindrical tubular beam 4 is longer than the vibrating length of the measuring pipe 2, so as to set the natural vibration frequency of the cylindrical tubular beam 4 lower than the Coriolis vibration frequency of the measuring pipe 2.

Figure 2:
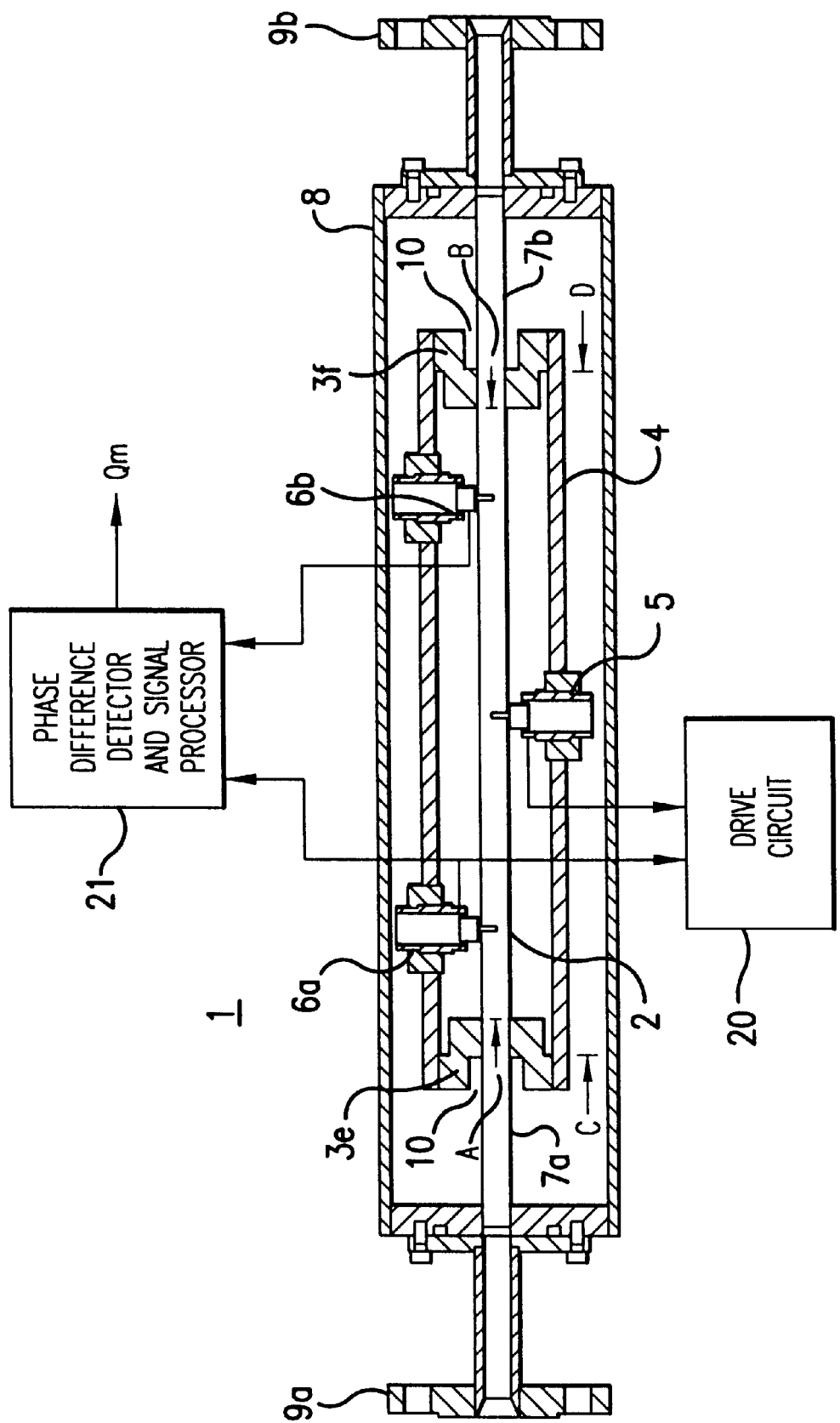
FIG. 2 is a cross-sectional view of an alternative embodiment of the invention.

FIG. 2 illustrates an alternative embodiment according to the invention, wherein support members 3e and 3f are positioned in the same manner as the members 3c and 3d of FIG. 1. The support members 3e and 3f are almost identical in shape to the respective members 3c and 3d, except that cutout portions 10, are formed around the respective through holes of the members 3e and 3f. The cutout portions 10, more strictly define the vibrating length of the measuring pipe 2 to be shorter than the vibrating length of the cylindrical tubular beam 4. In other words, the cutout portions 10, set the natural vibration frequency of the cylindrical tubular beam 4 to be lower than the Coriolis vibration frequency of the measuring pipe 2.

The embodiments of FIGS. 1 and 2 are applicable to the mass flowmeter that sets the Coriolis vibration frequency to be $\sqrt{2}$ times as high as the natural vibration frequency of the support mechanism, that sets the Coriolis vibration frequency of a higher order mode than the natural vibration frequency of the measuring pipe, that measures the flow rate based on the phase difference(s) between the output signals from two vibration sensors, or that uses speed sensors or acceleration sensors as the vibration sensors.

According to the invention, by setting the length of the measuring pipe pertinent to the vibration to be shorter than the length of the support mechanism pertinent to the vibration and without reducing the thickness of the support mechanism, accurate measurement by stable vibration is facilitated without any interference from the lowering of the characteristic values, such as natural vibration frequencies in the circumferential direction of the support mechanism. A simple mass flowmeter is therefore obtained which has low manufacturing costs, is lightweight, easy to use and which significantly improves the reliability and precision of mass flow rate measurement.

What is claimed is:

1. A mass flowmeter for measuring a flow rate of a fluid, comprising:

a measuring pipe for allowing a fluid to flow therethrough;

a vibrator contacting the measuring pipe, said vibrator providing a Coriolis vibration to the measuring pipe such that a Coriolis force is generated when the fluid flows through the measuring pipe;

at least one vibration sensor contacting the measuring pipe for detecting vibration of the measuring pipe; and a support mechanism including a beam, and two support members spaced apart from each other and fixed to the beam, each support member having a beam engaging portion engaging the beam and a measuring pipe engaging portion protruding inwardly from the beam engaging portion and engaging the measuring pipe to support the same, said support members being arranged symmetrically on the measuring pipe such that protruding directions of the measuring pipe engaging portions face each other and defining therebetween a length of the measuring pipe shorter than a length of the beam of the support mechanism so that a frequency of the Coriolis vibration applied to the measuring pipe is greater than a frequency of a natural vibration of the supporting mechanism.

2. A mass flowmeter according to claim 1, wherein said beam is a hollow beam to receive the measuring pipe therein, said support members retaining the measuring pipe in the hollow beam at two ends thereof.

3. A mass flowmeter according to claim 1, wherein said measuring pipe engaging portion includes a cutout portion at a side not to form said Coriolis vibration.

4. A mass flowmeter according to claim 1, wherein said vibrator vibrates the measuring pipe at the frequency of said Coriolis vibration at least $\sqrt{2}$ times the frequency of said natural vibration of said support mechanism.

5. A mass flowmeter according to claim 1, wherein said vibrator vibrates the measuring pipe at the frequency of said Coriolis vibration at an order mode higher than that of the natural vibration of the measuring pipe.

6. A mass flowmeter according to claim 1, wherein two vibration sensors contact the measuring pipe, said flow rate of said fluid being measured based on a phase difference of output signals from the two vibration sensors.

7. A mass flowmeter according to claim 1, wherein two vibration sensors are spaced apart from each other, said two vibration sensors and the vibrator being fixed to the beam.

8. A mass flowmeter according to claim 7, further comprising:

an inlet pipe connected to the measuring pipe for supplying the fluid to the measuring pipe;

an outlet pipe connected to the measuring pipe for flowing out the fluid from the measuring pipe; and a housing for housing the measuring pipe, the support mechanism, the vibrator, and the at least one vibration sensor.

9. A mass flowmeter according to claim 1, wherein said at least one vibration sensor comprises one of a speed sensor and an acceleration sensor.

10. A mass flowmeter for measuring a flow rate of a fluid, comprising:

a measuring pipe for allowing a fluid to flow therethrough;

a vibrator contacting the measuring pipe, said vibrator providing a Coriolis vibration to the measuring pipe such that a Coriolis force is generated when the fluid flows through the measuring pipe;

at least one vibration sensor contacting the measuring pipe for detecting vibration of the measuring pipe; and a support mechanism including a hollow beam to receive the measuring pipe therein, and two support members spaced apart from each other and fixed to the beam to retain the measuring pipe in the hollow beam at two ends thereof, each support member having a beam engaging portion and a measuring pipe engaging portion protruding inwardly from the beam engaging portion, said measuring pipe engaging portions engaging the measuring pipe to support the same and defining therebetween a length of the measuring pipe shorter than that of the support mechanism so that a frequency of the Coriolis vibration applied to the measuring pipe is greater than a frequency of a natural vibration of the supporting mechanism, said measuring pipe engaging portion having a cutout portion at a side not to form said coriolis vibration.

* * * * *